United States Statutory Invention Registration [19]

[11] Reg. Number: H608

Goolsby

[43] Published: Mar. 7, 1989

[54] DETECTING MULTIPLE PHASE FLOW IN A CONDUIT

[75] Inventor: Alvin D. Goolsby, Houston, Tex.

[73] Assignee: Shell Oil Company, Houston, Tex.

[21] Appl. No.: 947,729

[22] Filed: Dec. 30, 1986

[51] Int. Cl.[4] ..... G01S 9/66; G06G 7/57; G01F 1/66

[52] U.S. Cl. ..... 367/89; 367/908; 364/510; 73/861.25; 73/290 V

[58] Field of Search ..... 73/861.25, 861.02, 861.04, 73/861.06, 290 V, 290 R, 19; 367/88, 89, 104; 364/510; 340/621

[56] References Cited

U.S. PATENT DOCUMENTS

| | | | |
|---|---|---|---|
| 3,985,030 | 10/1976 | Charlton | 73/290 V |
| 4,386,409 | 5/1983 | Petroff | 364/510 |
| 4,491,008 | 1/1985 | Marini et al. | 73/290 V X |
| 4,646,273 | 2/1987 | Carlson et al. | 367/32 |
| 4,683,759 | 8/1987 | Skarsvaag et al. | 73/861.04 |

*Primary Examiner*—Stephen C. Buczinski
*Assistant Examiner*—Linda J. Wallace

[57] ABSTRACT

Multiple phase flow is detected and characterized in a fluid-containing conduit using a compressional wave acoustic transducer in the pulse-echo mode. The acoustic energy is transmitted in a transverse direction through the conduit and the returning echo is analyzed to determine if single or multiphase flow is present in the conduit.

16 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DETECTING MULTIPLE PHASE FLOW IN A CONDUIT

BACKGROUND OF THE INVENTION

The present invention relates to fluid transport, and more particularly to a method and apparatus for detecting whether or not there is multiple phase flow in a fluid-containing conduit such as a pipe or pipeline.

While much technology has developed relating to monitoring the flow of fluids within a pipeline, such as, for example, detecting the velocity of the fluid by Doppler shift techniques, it is still very difficult in many circumstances to determine whether or not the fluid is in a single phase or multi-phase condition.

Simply being able to detect whether or not there is multi-phase flow in a pipe can be very important. For example, in trying to diagnose delivery problems in a section of petroleum pipeline, the wrong diagnosis can be very expensive. In a mile long section of pipe, for example, the symptoms could be equally attributable to a restriction somewhere in the pipe or to two phase flow. If a restriction is implicated, flow in the pipe would have to be interrupted so that a positive determination could be made if a restriction was present, and so that the pipe could be cleaned. This can be quite expensive. Also, if compounds having potential environmental implications are involved, such a procedure can be difficult due to EPA regulations.

On the other hand, if the problem is due to multi-phase flow, such as gas evolving irom a liquid when the fluid should be transported in a purely liquid state, then the solution will be entirely different. For example, it may involve nothing more than overhauling the pump(s) involved or taking other steps to increase the pressure in the system su:ficiently to suppress the gaseous phase and thus eliminate the two phase flow.

A need therefore remains for a new and improved method and apparatus for detecting multiple phase flow in a fluid-containing conduit. Preferably such an improvement will be uncomplicated, highly effective, versatile, readily applicable to most fluid conducting lines, and capable of being implemented with little modification of already widely available equipment.

SUMMARY OF THE INVENTION

Briefly, the present invention meets the above needs and purposes with a new and improved method and apparatus for detecting multiple phase flow in a fluid-containing conduit using conventional ultrasonic flaw detection equipment. Non-medical equipment can be used, with a compression wave transducer using the pulse-echo mode. First, acoustic energy is transmitted across (i.e., in a generally transverse direction through) the conduit and (of course) the fluid contained therein. The type of echos returned, if any, furnish a highly informative finger print indicating whether or not multiple phase flow is present, and the character of the multiple phase flow when it is present. In the preferred embodiment, a calibration can be made on a similar conduit, pipe, or container with known single phase flow. The amplitude, shape, and time distribution of the echo then provides a direct indication ("echo indication"). The echo indication which is generated can then be compared with a predetermined reference standard, such as suggested above, for characterizing the flow.

With single phase flow, the return echo from the opposite wall of the conduit will be strong and the baseline trace will be free of indications. With mixed multi-phase flow the return echo from the opposite wall of the pipe will be weakened or non-existent, and hash or noise will be present on the baseline trace. With well separated multi-phase flow (e.g., in which the gas has risen to the top of the conduit), the location of the gas phase can be determined from an early echo return coming from a gas/liquid interface interiorly of the conduit, such an echo being detected sooner than it would be had it been reflected from the opposite wall of the conduit. Acoustic energy, preferably in the form of acoustic pulses, can be transmitted from a plurality of positions spaced around the conduit for specifying with even greater detail and accuracy the nature and distribution of the flow, if it is multi-phase, within the conduit. Continuous scanning around the conduit, either manually or automatically, as desired, may also be provided within the scope of the invention.

It is therefore an object of the present invention to provide a new and improved method and apparatus for detecting multiple phase flow in a fluid-containing conduit; such a method and apparatus in which acoustic energy is transmitted in a substantially transverse direction through such a conduit and the fluid therein; in which a detection is then made concerning whether or not there is a return echo, and an echo indication thereof is generated; in which a determination is made from the echo indication whether or not there is single phase or multiple phase flow in the conduit; in which a determination may be made when a return echo is detected, whether the echo is from the opposite wall of the conduit or from an interface interiorly thereof; in which the echo indication may indicate how strong or weak the echo was; in which it can be determined whether the phases are substantially separated and discrete, or substantially diffused and mixed; and to accomplish the above objects and purposes in an inexpensive, uncomplicated, durable, versatile and reliable method and apparatus, which can be inexpensively implemented in the majority of applications using existing conventional ultrasonic equipment, and is thus readily suited to the widest possible utilization in monitoring the phase flow status of fluid-containing conduits.

These and other objects and advantages of the invention will be apparent from the following description, the accompanying drawings, and the appended claims.

DESCRIPTION OF THE PREFERRED EMBODIMENT

Figure 1A:
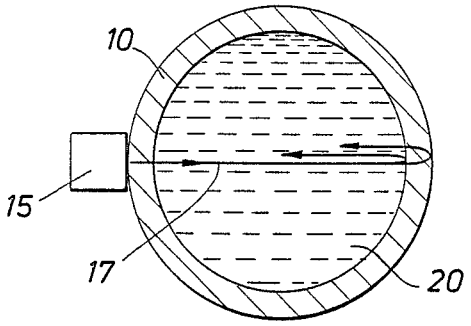
FIG. 1A illustrates a liquid filled pipeline being tested by an ultrasonic probe according to the present invention.

With reference to the drawings, the new and improved method and apparatus for detecting multiple phase flow in a fluid-containing conduit will be described. FIG. 1 shows a conduit or pipe 10 on the side of which is mounted a transducer 15 which sends acoustical energy, preferably in the form of pulses, shown traveling on pulse path 17, substantially transversely through the conduit 10 and the liquid 20 contained therein. Transducer 15 may simply be a compression wave transducer using any suitable conventional ultrasonic flaw detection equipment operating in the pulse-echo mode. In one embodiment, a 2¼ MHz by 1 inch diameter compression wave transducer was used with a conventional liquid couplant between the transducer 15 and the pipe 10, in combination with a screen imaging type ultrasonic flaw detector.

Figure 2A:
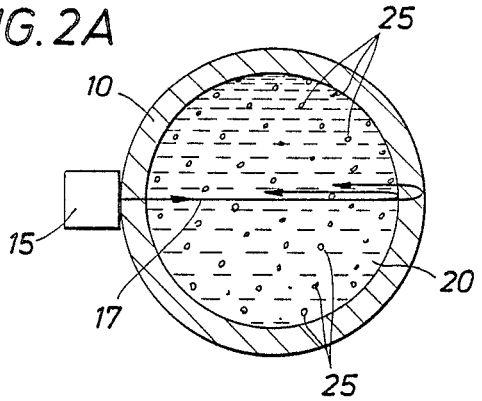
FIG. 2A is a view similar to FIG. 1A, in which multiple phase flow is present in the form of discrete gas bubbles mixed and diffused throughout the liquid.

FIG. 2A is similar to FIG. 1A except that small bubbles 25 are entrained, mixed, and diffused in the liquid 20.

Figure 3A:
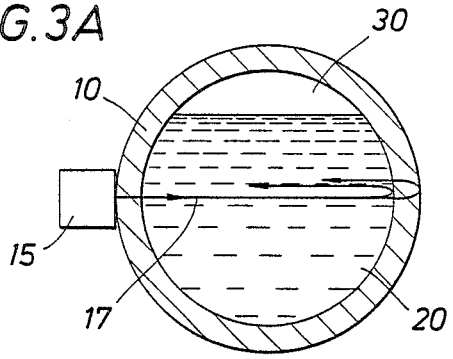
FIGS. 3A, 3B, 4A, 4B, 5A, and 5B, are again similar to the preceding figures, showing the conditions to be expected when there is multiple phase flow in which the gas phase is separated and discrete, the several figures illustrating the dependence of the result upon the particular rotated position from which the measurements are made.
Figure 4A:
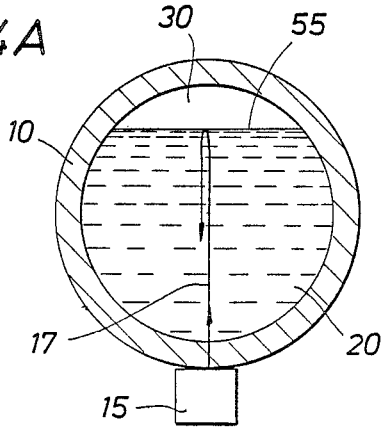
Figure 5A:
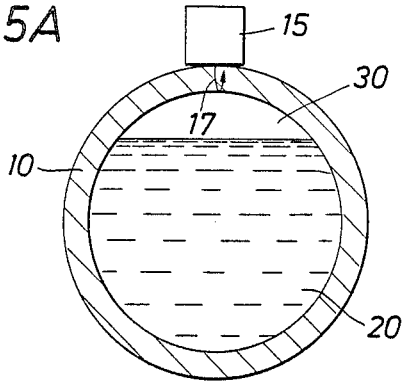

FIGS. 3A, 4A, and 5A show a discrete gas phase 30 separated from the liquid 20 along the top of the pipe 10.

Figure 6A:
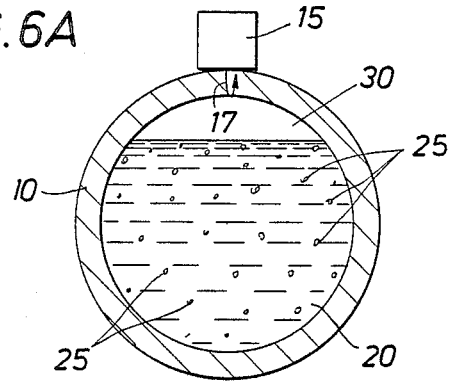
FIGS. 6A, 6B, 7A, 7B, 8A, and 8B correspond to FIGS. 3–5, additionally showing the effects of entrained gas bubbles traveling along with a discrete gas phase.
Figure 7A:
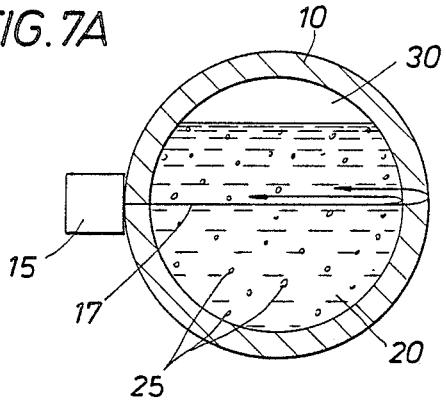
Figure 8A:
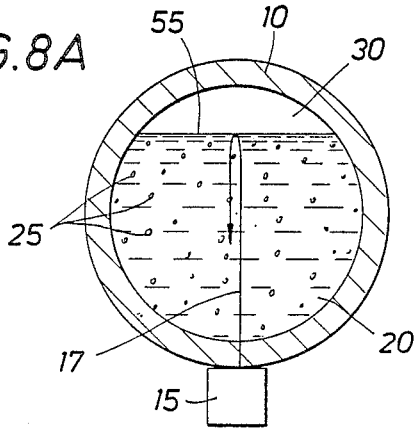

FIGS. 6A, 7A, and 8A show both bubbles 25 mixed into the liquid 20 and a discrete gas phase 30 separated from the liquid.

Figure 1B:
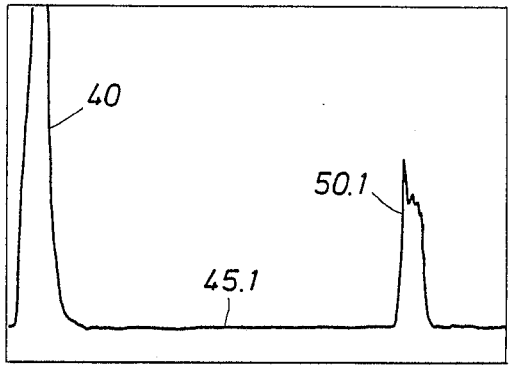
FIG. 1B is a graphical illustration of the transmitted and received pulse wave forms as reported by the probe in FIG. 1A.

FIG. 1B shows the output signal, in graphical form, which would be expected from the probe or transducer 15 in FIG. 1A. The initial pulse 40 is the "main bang" when the transducer injects the pulse into the conduit 10. During the time that the pulse then travels along the pulse path 17 (FIG. 1A) essentially no signal is heard at the transducer 15, so the base line signal or trace 45.1 is smooth and substantially free of any indication (FIG. 1B). As the pulse encounters the interface between the liquid 20 and conduit 10 on the side of the conduit pipe 10 opposite the transducer 15, the differences in acoustic impedance cause the pulse to be reflected back, continuing along path 17 and eventually returning to transducer 15. This return echo signal or trace 50.1 (FIG. 1B) is strong and reasonably sharp (the echoes from the inner and outer walls of the conduit itself probably not being separately resolved, depending on wall thickness). The signal profile thus represented in FIG. 1B is one type of echo indication, and is the indication representative of single phase flow.

Figure 2B:
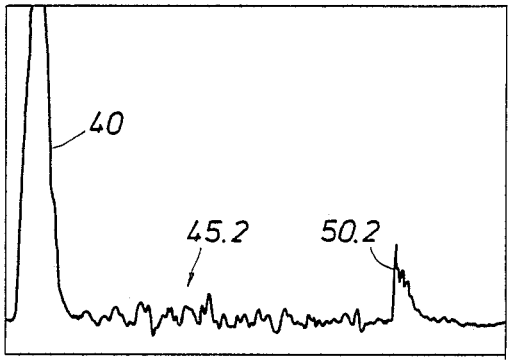
FIG. 2B is an illustration similar to FIG. 1B, showing the wave form generated when the multiple phase flow condition illustrated in FIG. 2A obtains.

FIG. 2B is similar to FIG. 1B except that the baseline trace 45.2 is noisy and jumpy. These substantial indications on the baseline trace 45.2 result from multiple small reflections from the various bubbles entrained within the liquid, each of which creates a reflective interface due to the substantial difference in the acoustic impedance of the gas bubble as compared with the liquid. The diffusion of the pulse energy in this manner also attenuates the return echo 50.2, which is seen to be much weaker than the echo 50.1 in FIG. 1B. The signal illustrated in FIG. 2B is thus an echo indication from which it can be determined that multiple phase flow is present, and furthermore that the multiple phase flow contains a large amount of diffused bubbles therein.

Figure 3B:
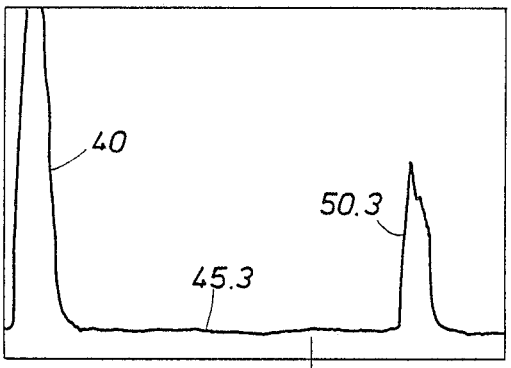

In FIGS. 3A and 3B, it will be seen that multiple phase flow having a discrete gas phase 30 is present, but the trace in FIG. 3B is substantially the same as that in FIG. 1B. A substantially transvere measurement which thus misses the discrete gas phase 30 will not be expected to detect it. Accordingly, in the preferred embodiment, several measurements are made at positions spaced around the conduit, from which very useful information characterizing the multiple phase flow, if present, can be derived, as will be shown. For purposes of discussion, these positions will be referred to as side (FIGS. 1–3 and 7), bottom (FIGS. 4 and 8), and top (FIGS. 5 and 6), although any appropriate positions around a conduit, which itself could be oriented in any particular direction, will of course be utilized in accordance with the present invention as the situation may require.

Figure 4B:
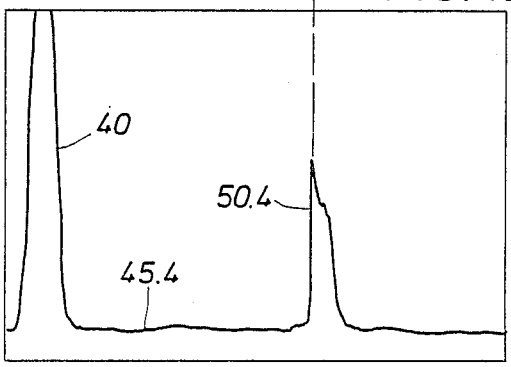
Figure 5B:
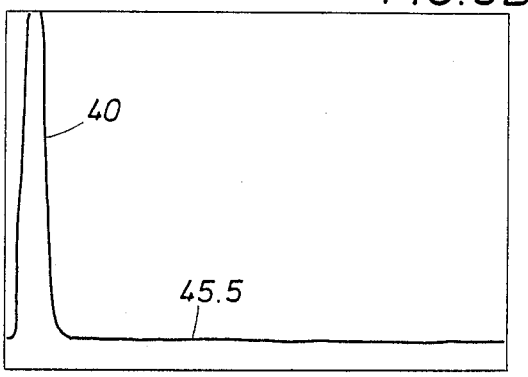

Referring then to FIGS. 4A and 4B, it will be seen that the interface 55 between the liquid 20 and the discrete gas phase 30 causes the pulse path 17 to be shortened and the return echo 50.4 to occur earlier in time than the return echos 50.1 and 50.3. This provides a direct indication not only that a discrete gas phase is present, but also gives an indication of its size. The top position illustrated in FIG. 5 provides additional information, confirming that a discrete gas phase is present adjacent that area of the conduit 10. In FIGS. 5A and 5B it will be seen that the pulse Path 17 is so short that the return echo is masked by the initial pulse 40.

Figure 6B:
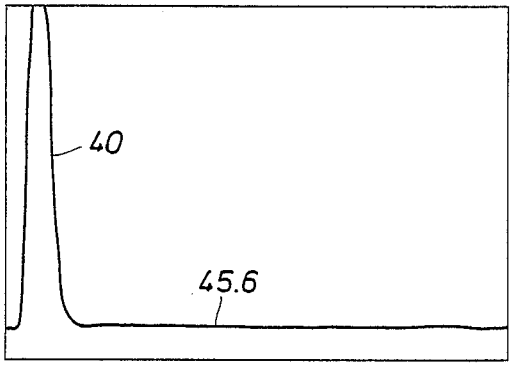
Figure 7B:
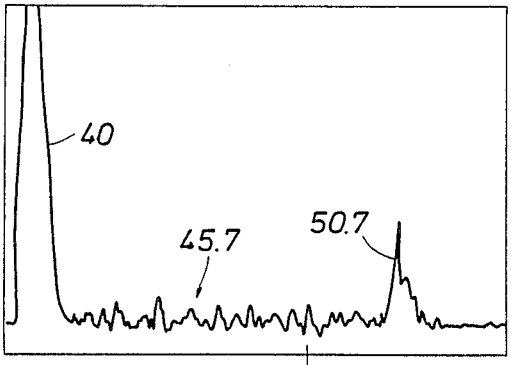
Figure 8B:
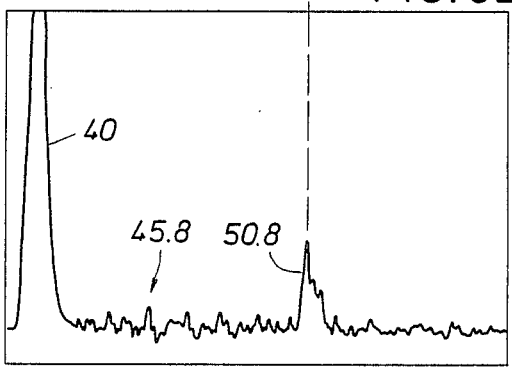

The interpretation of FIGS. 6–8 should now be readily apparent. Here both bubbles 25 and a discrete gas phase 30 are present. The transducer top position shown in FIG. 6A produces the same result in FIG. 6B as that obtained in FIGS. 5A and 5B. The result from the side position shown in FIGS. 7A and 7B corresponds to that illustrated in FIGS. 2A and 2B. FIGS. 8A and 8B reveal that the bottom position for the transducer 15 yields a result similar to that in FIGS. 7A and 7B except that the return echo 50.8 arrived sooner, for the same reasons explained in connection with the early return illustrated in FIG. 4B.

As may be seen, therefore, the present invention has numerous advantages. It is inexpensive and can be easily implemented utilizing readily available ultrasonic equipment. It is extremely versatile, and can be readily applied to a very wide variety of fluid transportation lines. It can easily and quickly detect the presence or absence of multiple phase flow in such a conduit, and also characterize whether that flow is separated and discrete, diffused and mixed, or both. Furthermore, although the phases discussed have been liquid and gas, detection of a solid phase is also comprehended within the scope of the present invention (e.g., precipitation occurring in a pipeline, or finding where solids are settling out). The results would be substantially the same as with mixed and diffused gas bubbles. Also, in appropriate circumstances, multiple phases of liquids (e.g., oil vs. water flowing together in a conduit) can be detected. The practical value and substantial commercial savings which can therefore be realized from the present invention will thus be very substantial.

While the methods and forms of apparatus herein described constitute preferred embodiments of this invention, it is to be understood that the invention is not limited to these precise methods and forms of apparatus, and that changes may be made therein withou departing from the scope of the invention.

What is claimed is:

1. A method for detecting multiple phase flow in a fluid-containing conduit, comprising:

a. transmitting acoustic energy in a substantially transverse direction through such a conduit and the fluid therein, b. detecting whether there is a return echo, and generating an echo indication thereof, and c. determining from the echo indication whether there is single phase or multiple phase flow.

2. The method of claim 1 further comprising determining, when a return echo is detected, whether the echo is from the opposite wall of the conduit or from an interface interiorly thereof.

3. The method of claim 2 further comprising determining that a detected echo is from such an interior interface by determining that the echo is detected sooner than it would be had it been reflected from the opposite wall of the conduit, thereby indicating the presence of a separated and discrete phase.

4. The method of claim 1 wherein said step of generating an echo indication further comprises generating an indication of whether a return echo was absent, was present, and, when present, how strong or weak the echo was in accordance with a predetermined reference.

5. The method of claim 1 wherein said determining step further comprises determining, when there is multiple phase flow, whether the phases are substantially separated and discrete, or substantially diffused and mixed.

6. The method of claim 5 further comprising determining, when there is multiple phase flow, that the phases are:

a. substantially separated and discrete when the echo indicator indicates that the echo has a baseline substantially free of indications, and b. substantially diffused and mixed when the echo indicator indicates that the echo has a baseline on which noise is present.

7. The method of claim 1 wherein:

a. said transmitting step further comprises transmitting acoustic energy from a plurality of positions spaced around the conduit, b. said detecting step further comprises detecting from a plurality of those spaced positions and generating a plurality of corresponding echo indications, and c. said determining step further comprises determining from a plurality of the echo indications whether there is single phase or multiple phase flow.

8. A method for detecting multiple phase flow in a fluid-containing conduit, comprising:

a. transmitting acoustic energy from a plurality of positions spaced around such a conduit substantially transversely through the conduit and the fluid therein, b. detecting from a plurality of those spaced positions whether there is a return echo, and generating a plurality of corresponding echo indications indicating whether a return echo was absent, was present, and when present, how strong or weak each echo was in accordance with a predetermined reference, c. determining from a plurality of the echo indications whether there is single phase or multiple phase flow, d. when multiple phase flow is determined, determining that the phases are:

i. substantially separated and discrete when the echo indicator indicates that the echo has a baseline substantially free of indications, and ii. substantially diffused and mixed when the echo indicator indicates that the echo has a baseline on which noise is present, and e. determining, when a return echo is detected, whether the echo is from the opposite wall of the conduit or from an interface interiorly thereof, by determining that a detected echo is from such an interior interface when the echo is detected sooner than it would be had it been reflected from the opposite wall of the conduit, thereby indicating the presence of a separated and discrete phase.

9. Apparatus for detecting multiple phase flow in a fluid-containing conduit, comprising:

a. means for transmitting acoustic energy in a substantially transverse direction through such a conduit and the fluid therein, b. means for detecting whether there is a return echo, and for generating an echo indication thereof, and c. means for determining from said echo indication whether there is single phase or multiple phase flow.

10. The apparatus of claim 9 further comprising means for determining, when a return echo is detected, whether the echo is from the opposite wall of the conduit or from an interface interiorly thereof.

11. The apparatus of claim 10 further comprising means for determining that a detected echo is from such an interior interface by determining that said echo is detected sooner than it would be had it been reflected from the opposite wall of the conduit, thereby indicating the presence of a separated and discrete phase.

12. The apparatus of claim 9 wherein said means for generating an echo indication further comprises means for generating an indication of whether a return echo was absent, was present, and, when present, how strong or weak said echo was in accordance with a predetermined reference.

13. The apparatus of claim 9 wherein said determining means further comprises means for determining, when there is multiple phase flow, whether said phases are substantially separated and discrete, or substantially diffused and mixed.

14. The apparatus of claim 13 further comprising means for determining, when there is multiple phase flow, that said phases are:

a. substantially separated and discrete when said echo indicator indicates that the echo has a baseline substantially free of indications, and b. substantially diffused and mixed when said echo indicator indicates that the echo has a baseline on which noise is present.

15. The apparatus of claim 9 wherein:

a. said means for transmitting further comprises means for transmitting said acoustic energy from a plurality of positions spaced around the conduit, b. said means for detecting further comprises means for detecting from a plurality of said spaced positions and generating a plurality of corresponding echo indications, and c. said means for determining further comprises means for determining from a plurality of said echo indications whether there is a single phase or multiple phase flow.

16. An apparatus for detecting multiple phase flow in a fluid-containing conduit, comprising:

a. means for transmitting acoustic energy from a plurality of positions spaced around such a conduit substantially transversely through the conduit and the fluid therein, b. means for detecting from a plurality of said spaced positions whether there is a return echo, and generating a plurality of corresponding echo indications indicating whether a return echo was absent, was present, and, when present, how strong or weak each said echo was in accordance with a predetermined reference, c. means for determining from a plurality of said echo indications whether there is single phase or multiple phase flow, d. means, when multiple phase flow is determined, for determining that said phases are:

i. substantially separated and discrete when said echo indicator indicates that the echo has a baseline substantially free of indications, and ii. substantially diffused and mixed when said echo indicator indicates that the echo has a baseline on which noise is present, and e. means for determining, when a return echo is detected, whether said echo is from the opposite wall of the conduit or from an interface interiorly thereof, by determining that a detected echo is from such an interior interface when said echo is detected sooner than it would be had it been reflected from the opposite wall of the conduit, thereby indicating the presence of a separated and discrete phase.

* * * * *